(12) United States Patent
Lim et al.

(10) Patent No.: US 6,731,620 B1
(45) Date of Patent: May 4, 2004

(54) METHOD FOR OPTIMALLY ALLOCATING CHANNEL POWER IN W-CDMA WILL SYSTEM

(75) Inventors: Young-Sik Lim, Kyonggi-do (KR); Pyeong-Hwan Wee, Kyonggi-do (KR)

(73) Assignee: Samsung Electronics Co., Ltd., Kyonggi-do (KR)

( * ) Notice: Subject to any disclaimer, the term of this patent is extended or adjusted under 35 U.S.C. 154(b) by 0 days.

(21) Appl. No.: 09/523,906

(22) Filed: Mar. 13, 2000

(30) Foreign Application Priority Data

Mar. 15, 1999 (KR) .......................................... 1999-8557

(51) Int. Cl.[7] .............................................. H04B 7/216
(52) U.S. Cl. ...................................... 370/335; 370/342
(58) Field of Search ................................ 370/335, 342, 370/318, 317, 320, 338; 455/446, 447, 522, 67.1, 67.3, 69

(56) References Cited

U.S. PATENT DOCUMENTS 6,188,906 B1 * 2/2001 Lim et al. .................... 455/453

6,477,376 B1 * 11/2002 Carter ......................... 455/446

* cited by examiner

Primary Examiner—Kwang Bin Yao
(74) Attorney, Agent, or Firm—Cha & Reiter, LLC (57) ABSTRACT

A method for allocating reverse and forward channel power in a W-CDMA WLL system is disclosed. The method comprises calculating a propagation path loss of forward and reverse pilot channels depending on the maximum path loss of forward and reverse links for a base station located at a specific distance from a terminal, determined from the minimum $E_c/I_t$ required by the system, the transmission antenna gain of a terminal, the reception antenna gain of the terminal, the reverse frequency reusing efficiency, the transmission output of the terminal, the number of active users, the power allocation ratio of the pilot channel, the bandwidth, and the thermal noise density; and, calculating a power allocation ratio of forward and reverse channels depending on the propagation path loss of the forward and reverse pilot channels, $E_b/N_t$ of the forward and reverse channels, the power allocation ratio of the forward and reverse pilot channels, the data rate of the forward and reverse channels, the bandwidth, and the reverse frequency reusing efficiency

11 Claims, 5 Drawing Sheets

METHOD FOR OPTIMALLY ALLOCATING CHANNEL POWER IN W-CDMA WLL SYSTEM

This application claims priority to an application entitled "Method for Optimally Allocating Channel Power in W-CDMA WLL system" filed in the Korean Industrial Property Office on Mar. 15, 1999 and assigned Serial No. 99-8557.

BACKGROUND OF THE INVENTION

1. Field of the Invention

The present invention relates generally to a method for optimally allocating channel power in a W-CDMA (Wideband Code Division Multiple Access) WLL (Wireless Local Loop) system, and in particular, for allocating required channel power so as to optimize a radio capacity and a coverage of a W-CDMA WLL system.

2. Description of the Related Art

In the CDMA system, reverse channels include an access channel and a traffic channel. The access channel is used when a mobile station starts communication with a base station, or when the mobile station sends a response to a paging channel message received from the base station. An IS-95 system has 32 access channels at a maximum, for one forward paging channel, and the access channels have a data rate of 4800 bps. The reverse traffic channel operates at 4 variable data rates, like the forward traffic channel. The access channels and the traffic channels are each separated by unique user long-period codes.

Further, in the CDMA system, forward channels include a pilot channel, a sync channel, a maximum of 7 paging channels and a maximum of 63 traffic channels.

The pilot channel is used when the mobile station acquires timing for the forward channels. That is, the pilot channel provides a phase reference for performing coherent demodulation. In addition, the pilot channel provides the mobile station with the means for comparing the strength of signals transmitted from the adjacent base stations to determine whether to perform a handoff. The sync channel operates at a data rate of 1200 bps and transmits a sync message to the mobile station to synchronize the reference time between the base station and the mobile station. Further, the sync channel provides information about a bit rate of the paging channel to enable the mobile station to accurately demodulate the paging channel.

The paging channel is used for transmitting control information such as a system parameter and paging a specific mobile station. Upon the receipt of an audio signal having variable data rates of 9600, 4800, 2400 and 1200 bps, the traffic channel multiplexes signaling information and transmits the multiplexed signaling information.

Figure 1:
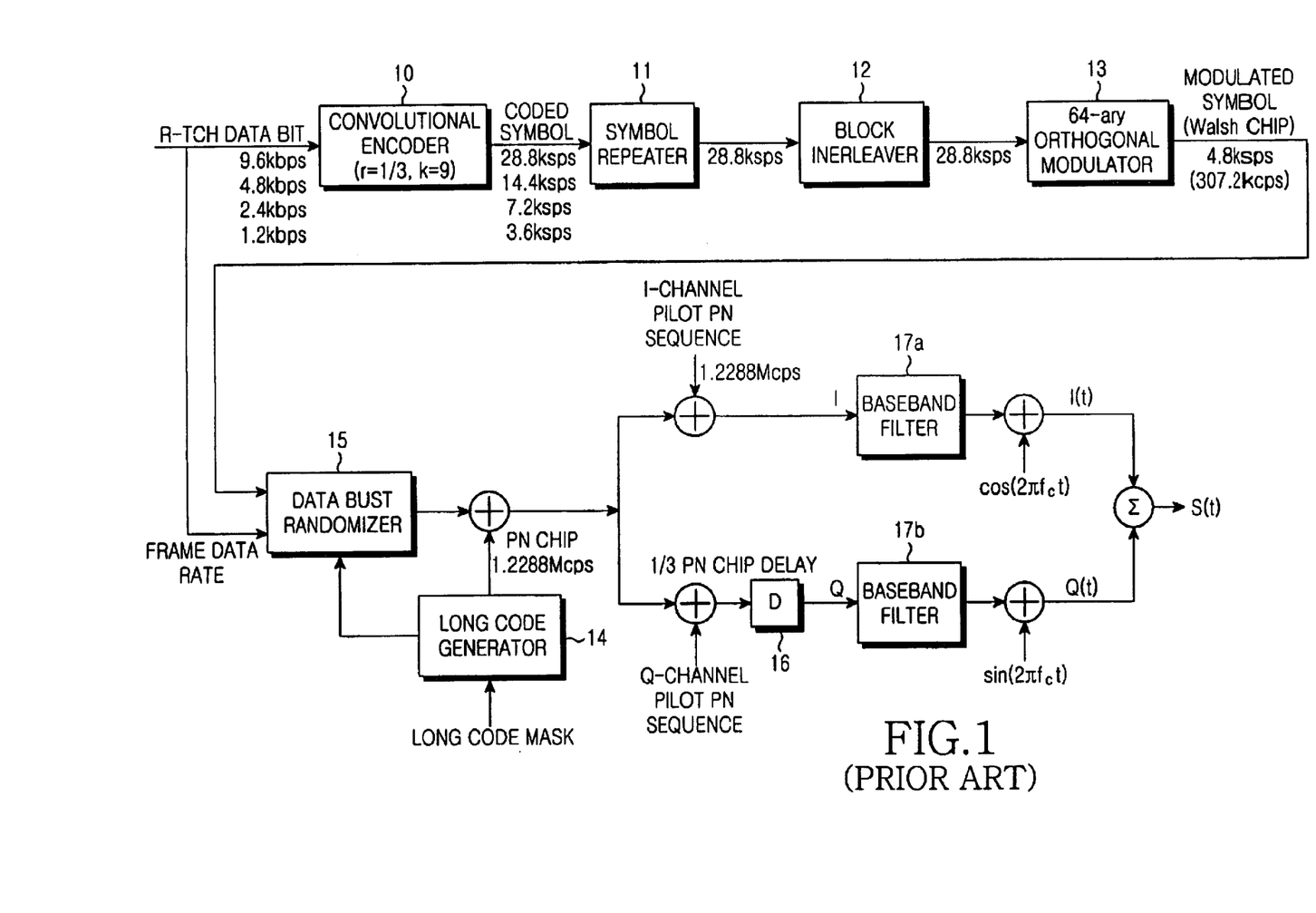
FIG. 1 is a block diagram illustrating the structure of a general reverse traffic channel.

FIG. 1 shows the structure of a general reverse traffic channel. As illustrated, the reverse traffic channel (R-TCH) includes 20 ms frames, each of which is comprised of 16 1.25 ms power control groups (PCGs). The user data is encoded by a coding rate r=⅓, constraint length K=9 convolutional encoder 10, repeated by a repeater 11 according to data rates, interleaved by an interleaver 12, and then orthogonally modulated by a 64-ary orthogonal modulator 13. The reverse traffic channel transmits the data only for a selected power control group at the same power, when the data rate is not 9600 bps. The reverse traffic channel intermittently transmits the data according to the data rates, and the locations are determined by a data burst randomizer 15 depending on the unique long-period PN codes of the respective users. Thereafter, the output of the data burst randomizer 15 is scrambled with a long-period PN code having a period of $2^{42}-1$ at a rate of 1.2288 MHz, and then OQPSK (Offset Quadrature Phase Shift Keying) modulated with a pair of two short-period pilot PN codes.

Figure 2:
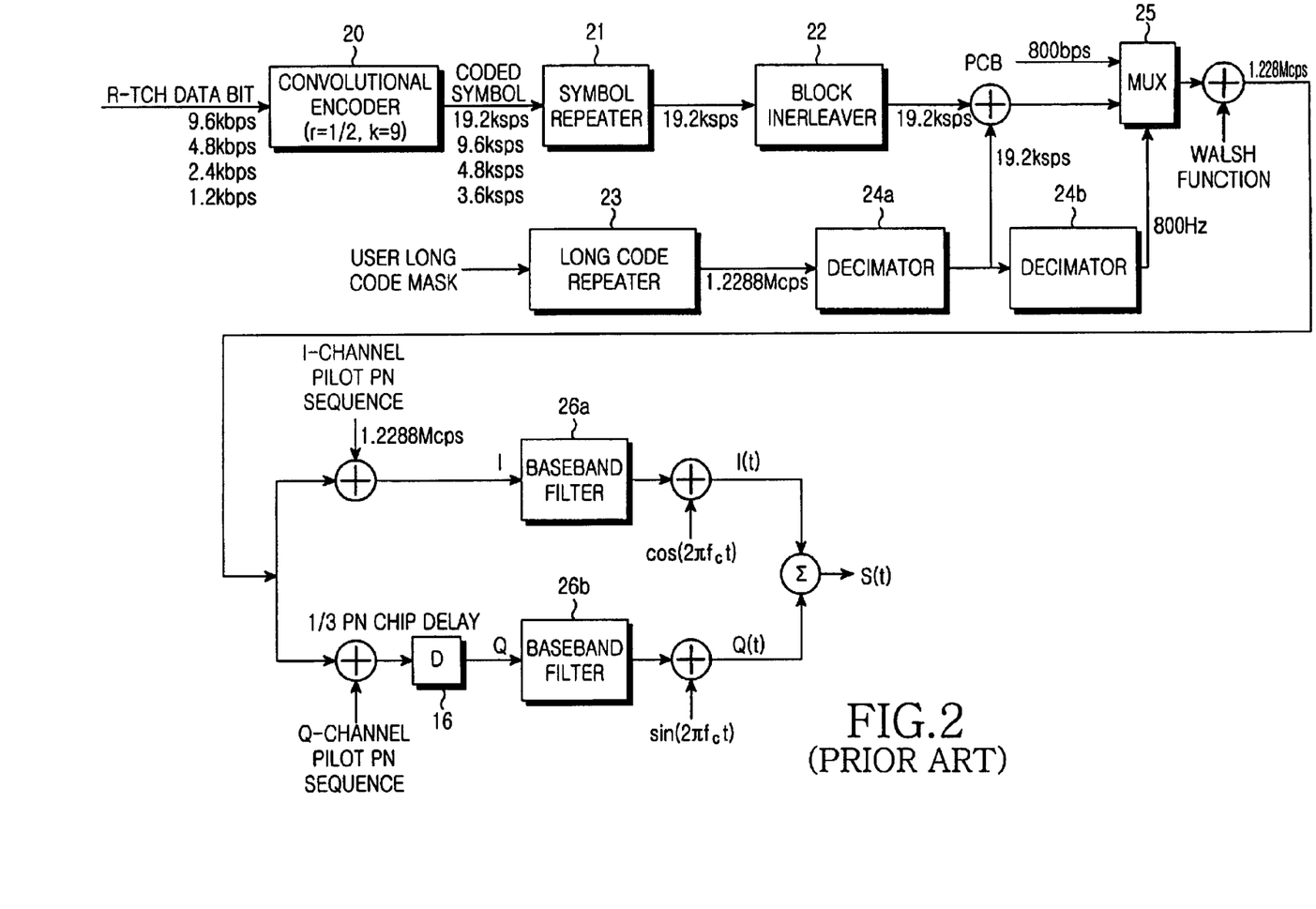
FIG. 2 is a block diagram illustrating the structure of a general forward traffic channel; and, FIGS. 3(a)–(c) are flow charts illustrating the operation steps of the present invention.

FIG. 2 shows the structure of a general forward traffic channel. As illustrated, the forward traffic channel includes 20 ms frames, each of which is comprised of 16 1.25 ms power control groups. The user data is encoded by an r=½, K=9 convolutional encoder 20, repeated by a repeater 21 according to data rates, and then interleaved by an interleaver 22. Thereafter, the user data is scrambled with a long-period PN code, and multiplied by one of the specified 64 Walsh codes to be spread into a signal having a rate of 1.2288 Mcps. Then, the signal is multiplied by a pair of two PN codes and undergoes the QPSK modulation before transmission.

Meanwhile, in the conventional CDMA WLL system, the base station and the mobile station cannot perform the proper power allocation of the radio channels and thus can not satisfy the performance requirements of the respective radio channels. Therefore, it is difficult to facilitate the optimization of the radio capacity and coverage of the system, thereby causing an unbalance of the forward coverage and the reverse coverage.

SUMMARY OF THE INVENTION

It is, therefore, an object of the present invention to provide a method for satisfying the performance requirements of respective channels, maximizing the radio capacity and coverage of the system and maintaining the balance of a forward coverage and a reverse coverage, in a W-CDMA WLL system.

To achieve the above object, there is provided a method for allocating reverse and forward channel power in a W-CDMA WLL system. The method includes the steps of calculating the propagation path loss of forward and reverse pilot channels depending on a maximum path loss of forward and reverse links for a base station located at a specific distance from a terminal, determined from a minimum $E_c/I_t$ required by the system, a transmission antenna gain of a terminal reception antenna gain of the terminal, a reverse frequency reusing efficiency, a transmission output of the terminal, a number of active users, a power allocation ratio of the pilot channel, a bandwidth, and a thermal noise density; and, calculating the power allocation ratio of forward and reverse channels depending on the propagation path loss of the forward and reverse pilot channels, $E_b/N_t$ of the forward and reverse channels, the power allocation ratio of the forward and reverse pilot channels, the data rate of the forward and reverse channels, the bandwidth, and the reverse frequency reusing efficiency.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

To determine an optimal channel power ratio of the forward and reverse channels in a WLL system, the quality requirements for the forward and reverse channels are calculated through performance test of the system.

Figure 3A:
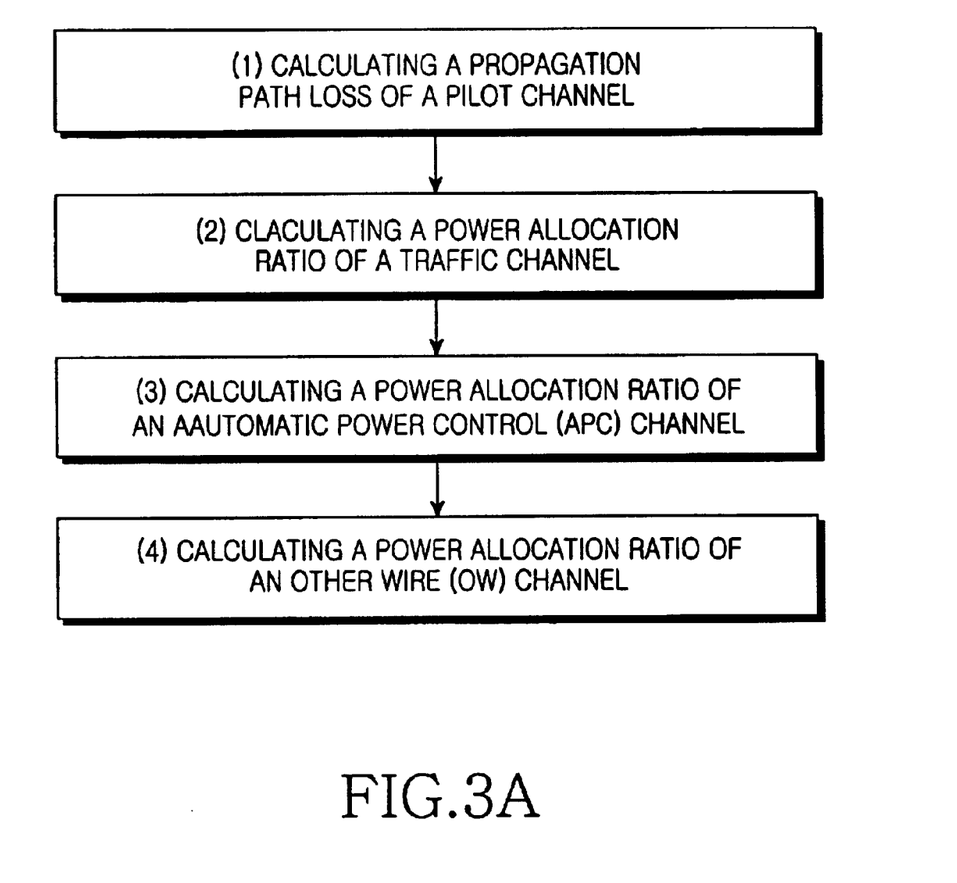

Referring to FIG. 3(a), a description will be first made of the process of calculating a reverse power allocation ratio. The reverse power allocation ratio is calculated based on a reverse pilot signal.

A propagation path loss of the pilot channel is calculated by Equation 1 below.

$$\frac{E_c}{I_t} = \frac{\xi_p P_t G_t G_r L(r)}{N_0 W + I_{sc}(r) + I_{oc}(r) W} = \frac{\xi_p P_t G_t G_r L(r)}{N_0 W + I_{sc}(r) + \left[1 + \frac{I_{oc}(r)}{I_{sc}(r)}\right]}$$

$$= \frac{\xi_p P_t G_t G_r L(r)}{N_0 W + \frac{1}{F_r} \cdot I_{sc}(r)} = \frac{\xi_p P_t G_t G_r L(r)}{N_0 W + \frac{1}{F_r} N P_t G_t G_r L(r)}$$

[Equation 1]

wherein, $N_t$: thermal noise density;
  $I_t$: total interference power;
  $I_{sc}$: same cell interference;
  $E_b$: energy density per bit;
  W: bandwidth;
  R: data rate;
  $\xi_p$: power allocation ratio of a pilot channel;
  L(r): propagation path loss of an RSC (base station) located at a distance r from an RNT (WLL terminal);
  $G_t$: transmission antenna gain of the RNT;
  $G_r$: reception antenna gain of the RSC;
  $F_r$: reverse frequency reusing efficiency;
  $P_t$: transmission output of the RNT;
  N: active users; and
  $N_0 W$: Thermal Noise, wherein $N_0 = kTF$, and wherein k is Boltzmann constant ($1.38 \times 10^{-23}$ W/K/Hz), T is absolute temperature (K), and F is noise figure(dB);

The maximum value of the propagation path loss L(r) of the reverse link is defined as:

$$L(r)_{max} = \frac{\left(\frac{E_c}{I_t}\right)_{min} \cdot N_0 W}{P_t G_t G_r \left[\xi_p - \left(\frac{E_c}{I_t}\right)_{min} \frac{1}{F_r}\right]}$$

[Equation 2]

In the cell area defined by the reverse pilot channel, receiving $E_b/N_t$ of an automatic power control (APC) channel, other wire (OW) channel which is a dedicated channel for signaling, and a traffic channel should satisfy specific requirements.

First, $E_b/N_t$ of the traffic channel is defined as:

$$\left[\frac{E_b}{N_t}\right]_{traff} = \frac{W}{R_{traff}} \cdot \frac{\xi_{traff} P_t G_t G_r L(r)}{N_0 W + \{(N-1) + (1 + -\xi_{traff})\} P_t G_t G_r L(r) \cdot \frac{1}{F_r}}$$

[Equation 3]

wherein, $\xi_{traff}$: power allocation ratio of the traffic channel; and,
  $R_{traffic}$: data rate of the traffic channel The propagation path loss $E_c/I_t$ of the pilot channel is determined by applying the propagation path loss of Equation 2 to Equation 1. Further, the power allocation ratio of the traffic channel $\xi_{traff}$ is derived from Equation 3 based on the maximum permissible propagation path loss defined by Equation 2 and $E_c/I_t$ defined by Equation 1.

$$\xi_{traff} = \frac{\xi_p \cdot \left(\frac{E_b}{N_t}\right)_{traff}}{\left(\frac{E_c}{I_t}\right) \cdot \left[\frac{W}{R_{traff}} + \frac{1}{F_r} \cdot \left(\frac{E_b}{N_t}\right)_{traff}\right]}$$

[Equation 4]

Similarly, the maximum power allocation ratio of the APC channel and the OW channel are calculated by Equations 5 and 6 below, respectively.

$$\xi_{APC} = \frac{\xi_p \cdot \left(\frac{E_b}{N_t}\right)_{APC}}{\left(\frac{E_c}{I_t}\right)_p \cdot \left[\frac{W}{R_{APC}} + \frac{1}{F_r} \cdot \left(\frac{E_b}{N_t}\right)_{APC}\right]}$$

[Equation 5]

$$\xi_{OW} = \frac{\xi_p \cdot \left(\frac{E_b}{N_t}\right)_{OW}}{\left(\frac{E_c}{I_t}\right)_p \cdot \left[\frac{W}{R_{OW}} + \frac{1}{F_r} \cdot \left(\frac{E_b}{N_t}\right)_{OW}\right]}$$

[Equation 6]

It is noted from Equations 4 to 6 that the power allocation ratios of the respective channels depend on $E_c/I_t$ threshold of the pilot channel, the power allocation ratio of the pilot channel, the Eb/Nt requirement of the respective channels, and the processing gain.

That is, the power allocation ratios of the respective channels are determined by calculating the propagation path loss L(r) in accordance with Equation 2 and then calculating $E_c/I_t$ using the calculated propagation path loss L(r) and the power allocation ratio of the pilot channel (which is previously determined by the system). The power allocation ratios of the respective channels are determined by placing the calculated propagation path loss and $E_c/I_t$ in Equations 4 to 6.

Figure 3B:
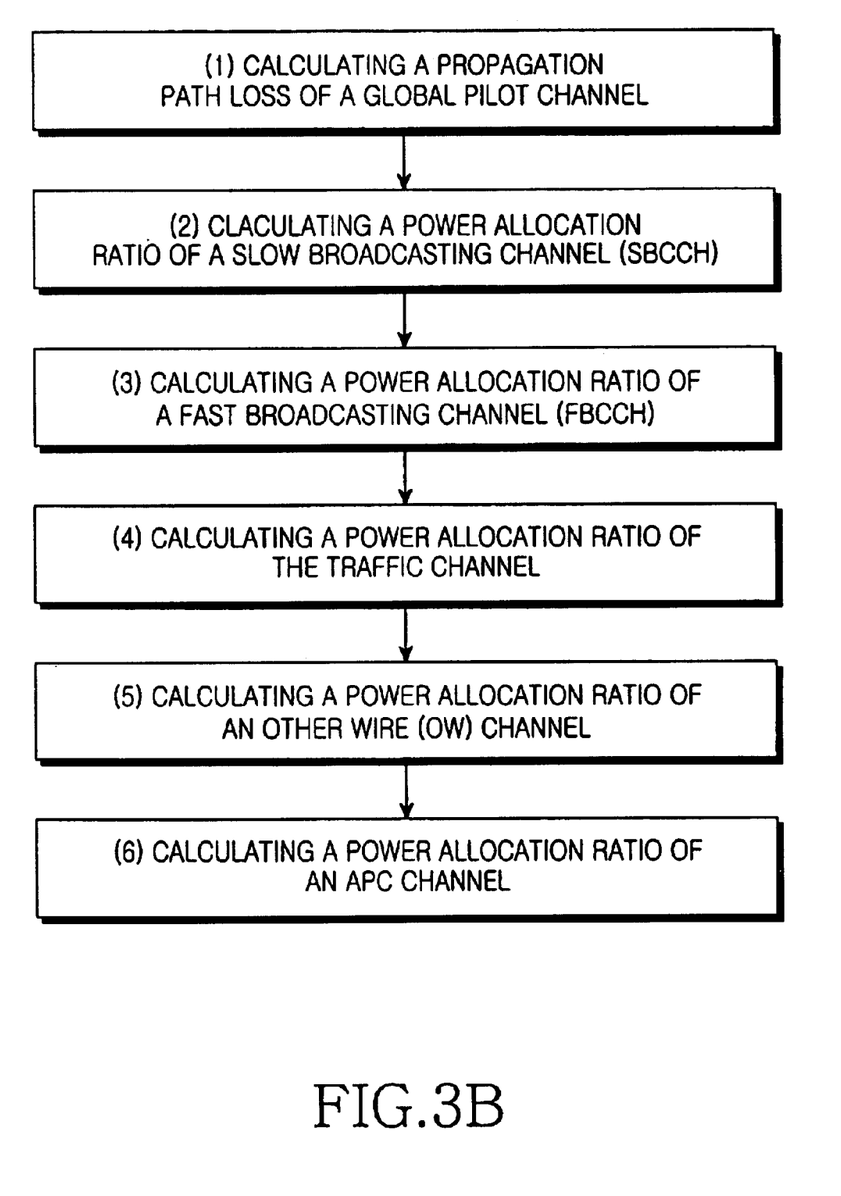

Similarly, referring to FIG. 3(b), the forward power allocation ratio is determined based on the forward pilot channel. First, $E_c/I_t$ of the forward pilot channel is defined as:

$$\frac{E_c}{I_t} = \frac{\xi_{GLPT} P_t G_t G_r L(r)}{N_0 W + I_{sc}(r) + I_{oc}(r) W} = \frac{\xi_{GLPT} P_t G_t G_r L(r)}{N_0 W + I_{sc}(r)\left[1 + \frac{I_{oc}(r)}{I_{sc}(r)}\right]} =$$

$$\frac{\xi_{GLPT} P_t G_t G_r L(r)}{N_0 W + \frac{1}{F_f} \cdot I_{sc}(r)} = \frac{\xi_{GLPT} P_t G_t G_r L(r)}{N_0 W + \frac{1}{F_f} P_t G_t G_r L(r)}$$

[Equation 8]

The maximum propagation path loss of the forward link is defined as:

$$L(r)_{max} = \frac{\left(\frac{E_c}{I_t}\right)_{min} \cdot N_0 W}{P_t G_t G_r \left[\xi_{GLPT} - \left(\frac{E_c}{I_t}\right)_{min} \frac{1}{F_f}\right]}$$

[Equation 9]

wherein,
  $\xi_p$: power allocation ratio of a global pilot channel;
  L(r): propagation path loss of an RNT (WLL terminal) located at a distance r from an RSC (base station);

$G_t$: transmission antenna gain of the RSC;

$G_r$: reception antenna gain of the RNT;

$F_f$: forward frequency reusing efficiency; and, $P_t$: transmission output of the RNT.

In the cell area defined by the forward global pilot channel, receiving $E_b/N_t$ of a slow broadcasting channel (SBCCH) and a fast broadcasting channel (FBCCH) for paging, an automatic power control (APC) channel, other wire (OW) channel, and a traffic channel should satisfy specific requirements.

First, $E_b/N_t$ of the SBCCH channel is defined as:

$$\left[\frac{E_b}{N_t}\right]_{SBCCH} = \frac{W}{R_{SBCCH}} \cdot \frac{\xi_{SBCCH} P_t G_t G_r L(r)}{N_o W + (1 - \xi_{SBCCH}) P_t G_t G_r L(r) \cdot \frac{1}{F_f}}$$ [Equation 10]

wherein, $\xi_{SBCCH}$: power allocation ratio of the SBCCH channel; and, $R_{SBCCH}$: data rate of the SBCCH channel.

The propagation path loss $\xi_{FBCCH}$ of the SBCCH channel is determined by applying the maximum permissible propagation path loss of the global pilot channel, given by Equation 9 to Equation 10.

$$\xi_{SBCCH} = \frac{\xi_{GLPT} \cdot \left(\frac{E_b}{N_t}\right)_{SBCCH}}{\left(\frac{E_c}{I_t}\right)_{GLPT} \cdot \left[\frac{W}{R_{SBCCH}} + \frac{1}{F_f} \cdot \left(\frac{E_b}{N_t}\right)_{SBCCH}\right]}$$ [Equation 11]

Similarly, the maximum power allocation ratio of FBCCH channel, the traffic channel, the APC channel and the OW channel are calculated by Equations 12 to 15 below, respectively:

$$\xi_{FBCCH} = \frac{\xi_{GLPT} \cdot \left(\frac{E_b}{N_t}\right)_{GBCCH}}{\left(\frac{E_c}{I_t}\right)_{GLPT} \cdot \left[\frac{W}{R_{FBCCH}} + \frac{1}{F_f} \cdot \left(\frac{E_b}{N_t}\right)_{FBCCH}\right]}$$ [Equation 12]

$$\xi_{traff} = \frac{\xi_{GLPT} \cdot \left(\frac{E_b}{N_t}\right)_{traff}}{\left(\frac{E_c}{I_t}\right)_{GLPT} \cdot \left[\frac{W}{R_{traff}} + \frac{1}{F_f} \cdot \left(\frac{E_b}{N_t}\right)_{traff}\right]}$$ [Equation 13]

$$\xi_{APC} = \frac{\xi_{GLPT} \cdot \left(\frac{E_b}{N_t}\right)_{APC}}{\left(\frac{E_c}{I_t}\right)_{GLPT} \cdot \left[\frac{W}{R_{APC}} + \frac{1}{F_f} \cdot \left(\frac{E_b}{N_t}\right)_{APC}\right]}$$ [Equation 14]

$$\xi_{OW} = \frac{\xi_{GLPT} \cdot \left(\frac{E_b}{N_t}\right)_{OW}}{\left(\frac{E_c}{I_t}\right)_{GLPT} \cdot \left[\frac{W}{R_{OW}} + \frac{1}{F_f} \cdot \left(\frac{E_b}{N_t}\right)_{OW}\right]}$$ [Equation 15]

A description will now be made of how to apply the above channel power allocation method to the WLL system.

Figure 3C:
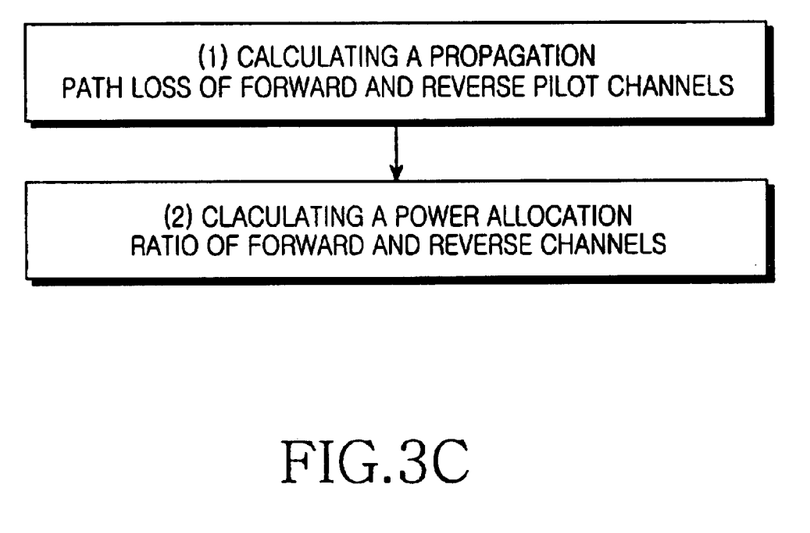

First, reference will be made to the quality requirements for the forward and reverse channels as shown in FIG. 3(c).

Reverse Channels

TABLE 1

| | Data Rate (Kbps) | Eb/Nt Requirement or Ec/It Threshold | BER (Bit Error Rate) | Remarks |
|---|---|---|---|---|
| Traffic CH | 32 | 4 dB | 10–4 | cf.SP31370 (Ch. 3.5) |
| APCCH | 64 | −0.5 dB | 0.2 | |
| OWCH | 16 | 5.5 dB | 10–7 | |
| Pilot CH | 8320 | −20.6 dB | | |

Forward Channels

TABLE 2

| | Data Rate (Kbps) | Eb/Nt Requirement or Ec/It Threshold | BER (Bit Error Rate) | Remarks |
|---|---|---|---|---|
| Traffic CH | 32 | 4 dB | 10–4 | cf.SP31370 (Ch. 3.5) |
| APCCH | 64 | −0.5 dB | 0.2 | |
| OWCH | 16 | 5.5 dB | 10–7 | |
| SBCCH | 16 | 5.5 dB | 10–7 | |
| FBCCH | 16 | 5.5 dB | 10–7 | |
| Pilot CH | 8320 | −14.6 dB | | |

Tables 3 and 4 below show the power allocation ratios determined by applying the values of Tables 1 and 2 to the Equations stated above.

Reverse Channels

TABLE 3

| Channel | Power Allocation Ratio | Digital Gain | Remarks |
|---|---|---|---|
| Global Pilot CH | 0.285 | 14 | Max Tx Output of RNT:0.1 W |
| Traffic CH | 0.313 | 20 | |
| APCCH | 0.223 | 12 | |
| OWCH | 0.222 | 17 | |

A digital gain relationship between the reverse traffic channel and the other reverse channels can be expressed as follows:

$$\frac{\xi_p}{\xi_{traff}} = \frac{2 \cdot DG_p^2}{DG_{traff}^2};$$ [Equation 7-1]

$$\frac{\xi_{APC}}{\xi_{traff}} = \frac{2 \cdot DG_{APC}^2}{DG_{traff}^2}; \text{ and,}$$ [Equation 7-2]

$$\frac{\xi_{OW}}{\xi_{traff}} = \frac{2 \cdot DG_{OW}^2}{DG_{traff}^2}$$ [Equation 7-3]

Table 3 shows the digital gains of the respective channels when the digital gain of the traffic channel is 20 in the RNT (WLL terminal). Table 3 shows the values for determining the power ratio between the channels, rather than the absolute transmission level.

From the calculated channel power ratio, the digital gains of the respective channels are calculated as follows:

$$DG_p = \sqrt{DG_{traff}^2 \cdot \frac{\xi_p}{\xi_{traff}} \cdot \frac{1}{2}} = \sqrt{20^2 \cdot \frac{0.285}{0.313} \cdot \frac{1}{2}} = 14;$$

$$DG_{APC} = \sqrt{DG_{traff}^2 \cdot \frac{\xi_{APC}}{\xi_{traff}} \cdot \frac{1}{2}} = \sqrt{20^2 \cdot \frac{0.285}{0.313} \cdot \frac{1}{2}} = 14;\text{ and,}$$

$$DG_{OW} = \sqrt{DG_{traff}^2 \cdot \frac{\xi_{OW}}{\xi_{traff}}} = \sqrt{20^2 \cdot \frac{0.222}{0.313}} = 17.$$

Table 4 below shows the forward channel power ratios determined by applying the system requirements of Table 2 to the Equations stated above. Unlike Table 3, the sum of the power allocation ratios does not become 1, because of the common channels (global pilot channel, SBCCH and PBCCH) and the dedicated channels (traffic channel, APC channel and OW channel). That is, the common channels have the same power, but the dedicated channels have the power determined in consideration of the WLL terminals.

Forward Channels

TABLE 4

| Channel | Power Allocation Ratio | Digital Gain | Remarks |
|---|---|---|---|
| Global Pilot CH | 0.035 | 119 | Max Tx Output of RSC:35 W |
| SBCCH | 0.0068 | 74 | |
| FBCCH | 0.0068 | 74 | |
| Traffic CH | 0.0096 | 88 | |
| APCCH | 0.0068 | 37 | |
| OWCH | 0.0068 | 74 | |

With regard to the relationship between the channel power ratio and the digital gain, when the maximum transmission output is 35W and the digital gain of the global pilot channel is 119, the gain ratios of the respective channels are:

$$DG_{GLPT} = \sqrt{167^2 \cdot \frac{1.225}{2.41}} = 119;$$

$$DG_{SBCCH} = \sqrt{2 \cdot 167^2 \cdot \frac{0.238}{2.41}} = 74;$$

$$DG_{FBCCH} = \sqrt{2 \cdot 167^2 \cdot \frac{0.238}{2.41}} = 74;$$

$$DG_{traff} = \sqrt{2 \cdot 167^2 \cdot \frac{0.336}{2.41}} = 88;$$

$$DG_{GLPT} = \sqrt{167^2 \cdot \frac{0.119}{2.41}} = 37;\text{ and,}$$

$$DG_{OW} = \sqrt{2 \cdot 167^2 \cdot \frac{0.238}{2.41}} = 74.$$

As described above, the novel channel power allocation method can maximize the radio capacity and the coverage of the system while satisfying the quality requirements of the respective channels, and maintain a balance of the forward and reverse coverages.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for allocating reverse channel power in a W-CDMA (Wideband Code Division Multiple Access) WWL (Wireless Local Loop) system, the method comprising the steps of:

(1) calculating a propagation path loss of a pilot channel depending on a maximum path loss of a reverse link for a base station located at a specific distance from a terminal, which is determined from a minimum $E_c$ (energy per bit after channel coding), /$I_t$ (total interference power) required by the system, a transmission antenna gain of the terminal, a reception antenna gain of the terminal, a reverse frequency reusing efficiency, a transmission output of the terminal, a number of active users, a power allocation ratio of the pilot channel, a bandwidth, and a thermal noise density;

(2) calculating a power allocation ratio of a traffic channel depending on a propagation path loss of the pilot channel, $E_b$ (energy density per bit)/$N_t$ (thermal noise density) of the traffic channel, the power allocation ratio of the pilot channel, a data rate of the traffic channel, the bandwidth, and the reverse frequency reusing efficiency;

(3) calculating a power allocation ratio of an automatic power control (APC) channel depending on the propagation path loss of the pilot channel, $E_b/N_t$ of the APC channel, the power allocation ratio of the pilot channel, a data rate of the APC channel, the bandwidth, and the reverse frequency reusing efficiency; and, (4) calculating a power allocation ratio of an other wire (OW) channel depending on the propagation path loss of the pilot channel, $E_b/N_t$ of the OW channel, the power allocation ratio of the pilot channel, a data rate of the OW channel, the bandwidth, the reverse frequency reusing efficiency.

2. The method as claimed in claim 1, wherein a maximum power allocation ratio of the traffic channel in step (2) is defined as $$\xi_{traff} = \frac{\xi_p \cdot \left(\frac{E_b}{N_t}\right)_{traff}}{\left(\frac{E_c}{I_t}\right)_p \cdot \left[\frac{W}{R_{traff}} + \frac{1}{F_r} \cdot \left(\frac{E_b}{N_t}\right)_{traff}\right]}$$

wherein, $\xi_p$: power allocation ratio of the pilot channel;
W: bandwidth;
$R_{traff}$: data rate of the traffic channel;

$\left(\frac{E_c}{I_t}\right)_p$:

propagation path loss of the global pilot channel;
$F_r$: reverse frequency reusing efficiency; and
$F_r$: reverse frequency reusing efficiency.

3. The method as claimed in claim 1, wherein a maximum power allocation ratio of the APC channel in step (3) is defined as:

$$\xi_{APC} = \frac{\xi_p \cdot \left(\frac{E_b}{N_t}\right)_{APC}}{\left(\frac{E_c}{I_t}\right)_p \cdot \left[\frac{W}{R_{APC}} + \frac{1}{F_r} \cdot \left(\frac{E_b}{N_t}\right)_{APC}\right]}$$

wherein, $\xi_p$: power allocation ratio of the pilot channel;
W: bandwidth;

$\left(\frac{E_c}{I_t}\right)_p$:

propagation path loss of the global pilot channel;

$R_{APC}$: data rate of the APC channel; and
$F_r$: reverse frequency reusing efficiency.

4. The method as claimed in claim 1, wherein the maximum power allocation ratio of the OW channel in step (4) is defined as:

$$E_{OW} = \frac{\xi_p \cdot \left(\frac{E_b}{N_t}\right)_{OW}}{\left(\frac{E_c}{I_t}\right)_p \cdot \left[\frac{W}{R_{OW}} + \frac{1}{F_r} \cdot \left(\frac{E_b}{N_t}\right)_{OW}\right]}$$

wherein, $\xi_p$: power allocation ratio of the pilot channel;
W: bandwidth;

$\left(\frac{E_c}{I_t}\right)_p$:

propagation path loss of the pilot channel;

$R_{ow}$: data rate of the OW channel; and
$F_r$: reverse frequency reusing efficiency.

5. A method for allocating forward channel power in a W-CDMA WLL system, the method comprising the steps of:

(1) calculating a propagation path loss of a global pilot channel depending on a maximum path loss of a forward link for a base station located at a specific distance from a terminal, which is determined from a minimum $E_c$ (energy per bit after channel coding /$I_t$ (total interference power) required by the system, a reception antenna gain of the terminal, a transmission output of the terminal, a forward frequency reusing efficiency, a transmission antenna gain of the base station, a power allocation ratio of the global pilot channel, a bandwidth, and a thermal noise density;

(2) calculating a power allocation ratio of a slow broadcasting channel (SBCCH) depending on a propagation path loss of the global pilot channel, $E_b$ (energy density per bit)/$N_t$ (thermal noise density) of the SBCCH channel, the power allocation ratio of the global pilot channel, a data rate of the SBCCH channel, the bandwidth, and the forward frequency reusing efficiency;

(3) calculating a power allocation ratio of a fast broadcasting channel (FBCCH) depending on a propagation path loss of the global pilot channel, $E_b/N_t$ of the FBCCH channel, the power allocation ratio of the global pilot channel, a data rate of the FBCCH channel, the bandwidth, and the forward frequency reusing efficiency;

(4) calculating a power allocation ratio of the traffic channel depending on the propagation path loss of the global pilot channel, $E_b/N_t$ of the traffic channel, tie power allocation ratio of the global pilot channel, a data rate of the traffic channel, the bandwidth, and the forward frequency reusing efficiency;

(5) calculating a power allocation ratio of an other wire (OW) channel depending on the propagation path loss of the global pilot channel, $E_b/N_t$ of the OW channel the power allocation ratio of the global pilot channel, a data rate of the OW channel, the bandwidth, and the forward frequency reusing efficiency, and, (6) calculating a power allocation ratio of an APC channel depending on the propagation path loss of the global pilot channel, $E_b/N_t$ of the APC channel, the power allocation ratio of the global pilot channel, a data rate of the APC channel, the bandwidth, the forward frequency reusing efficiency.

6. The method as claimed in claim 1, wherein the maximum power allocation ratio of the SBCCH channel is defined as:

$$\xi_{SBCCH} = \frac{\xi_{GLPT} \cdot \left(\frac{E_b}{N_t}\right)_{SBCCH}}{\left(\frac{E_c}{I_t}\right)_{GLPT} \cdot \left[\frac{W}{R_{SBCCH}} + \frac{1}{F_f} \cdot \left(\frac{E_b}{N_t}\right)_{SBCCH}\right]}$$

wherein, $R_{SBCCH}$: data rate of the SBCCH channel;

$\left(\frac{E_c}{I_t}\right)_{GLPT}$:

propagation path loss of the global pilot channel;

$\xi_{GLPT}$: power allocation ratio of the global pilot channel; and, $F_f$: forward frequency reusing efficiency.

7. The method as claimed in claim 1, wherein a maximum power allocation ratio of the FBCCH channel is defined as:

$$\xi_{FBCCH} = \frac{\xi_{GLPT} \cdot \left(\frac{E_b}{N_t}\right)_{FBCCH}}{\left(\frac{E_c}{I_t}\right)_{GLPT} \cdot \left[\frac{W}{R_{FBCCH}} + \frac{1}{F_f} \cdot \left(\frac{E_b}{N_t}\right)_{FBCCH}\right]}$$

$R_{FBCCH}$: data rate of the FBCCH channel;

$\left(\frac{E_c}{I_t}\right)_{GLPT}$:

propagation path loss of the global pilot channel;

$\xi_{GLPT}$: power allocation ratio of the global pilot channel; and, $F_f$: forward frequency reusing efficiency.

8. The method as claimed in claim 1, wherein the maximum power allocation ratio of the traffic channel is defined as:

$$\xi_{traff} = \frac{\xi_{GLPT} \cdot \left(\frac{E_b}{N_t}\right)_{traff}}{\left(\frac{E_c}{I_t}\right)_{GLPT} \cdot \left[\frac{W}{R_{traff}} + \frac{1}{F_f} \cdot \left(\frac{E_b}{N_t}\right)_{traff}\right]}$$

$R_{traff}$: data rate of the traffic channel;

$\left(\frac{E_c}{I_t}\right)_{GLPT}$:

propagation path loss of the global pilot channel;

$\xi_{GLPT}$: power allocation ratio of the global pilot channel; and, $F_f$: forward frequency reusing efficiency.

9. The method as claimed in claim 1, wherein the maximum power allocation ratio of the APC channel is defined as:

$$\xi_{APC} = \frac{\xi_{GLPT} \cdot \left(\frac{E_b}{N_t}\right)_{APC}}{\left(\frac{E_c}{I_t}\right)_{GLPT} \cdot \left[\frac{W}{R_{APC}} + \frac{1}{F_f} \cdot \left(\frac{E_b}{N_t}\right)_{APC}\right]}$$

$\xi_{GLPT}$: power allocation ratio of the global channel; and $\left(\frac{E_c}{I_t}\right)_{GLPT}$:

propagation path loss of the global pilot channel.

10. The method as claimed in claim 1, wherein a maximum power allocation ratio of the OW channel is defined as:

$$\xi_{OW} = \frac{\xi_{GLPT} \cdot \left(\frac{E_b}{N_t}\right)_{OW}}{\left(\frac{E_c}{I_t}\right)_{GLPT} \cdot \left[\frac{W}{R_{OW}} + \frac{1}{F_f} \cdot \left(\frac{E_b}{N_t}\right)_{OW}\right]}$$

$\xi_{GLPT}$: power allocation ratio of the global pilot channel; and $\left(\frac{E_c}{I_t}\right)_{GLPT}$:

propagation path loss of the global pilot channel.

11. A method for allocating reverse and forward channel power in a W-CDMA WLL system, the method comprising the steps of:

(1) calculating a propagation path loss of forward and reverse pilot channels depending on a maximum path loss of forward and reverse links for a base station located at a specific distance from a terminal, which is determined from a minimum $E_c$ (energy per bit after channel coding) /$I_t$ (total interference power) required by the system, a transmission antenna gain of a terminal, a reception antenna gain of the terminal, a reverse frequency reusing efficiency, a transmission output of the terminal, a number of active users, a power allocation ratio of the pilot channel, a bandwidth, and a thermal noise density; and, (2) calculating a power allocation ratio of forward and reverse channels depending on a propagation path loss of the forward and reverse pilot channels, $E_b$ (energy density per bit)//$N_t$ (thermal noise density) of the forward and reverse channels, a power allocation ratio of the forward and reverse pilot channels, a data rate of the forward and reverse channels, the bandwidth, and the reverse frequency reusing efficiency.

* * * * *